(12) United States Patent
Kobayashi

(10) Patent No.: US 12,055,746 B2
(45) Date of Patent: Aug. 6, 2024

(54) LIGHTING DEVICE

(71) Applicant: Aitec System Co., Ltd., Kanagawa (JP)

(72) Inventor: Hiromitsu Kobayashi, Kanagawa (JP)

(73) Assignee: Altec System Co., Ltd., Tokyo (JP)

( * ) Notice: Subject to any disclaimer, the term of this patent is extended or adjusted under 35 U.S.C. 154(b) by 0 days.

(21) Appl. No.: 18/262,188

(22) PCT Filed: Jan. 17, 2022

(86) PCT No.: PCT/JP2022/001478
§ 371 (c)(1),
(2) Date: Jul. 19, 2023

(87) PCT Pub. No.: WO2022/158431
PCT Pub. Date: Jul. 28, 2022

(65) Prior Publication Data
US 2024/0036243 A1 Feb. 1, 2024

(30) Foreign Application Priority Data

Jan. 20, 2021 (JP) .............................. 2021-006904
Jan. 20, 2021 (JP) .............................. 2021-006905

(51) Int. Cl.
*F21V 8/00* (2006.01)
(52) U.S. Cl.
CPC ......... *G02B 6/0036* (2013.01); *G02B 6/0055* (2013.01); *G02B 6/0068* (2013.01)

(58) Field of Classification Search
CPC ... G02B 6/0036; G02B 6/0055; G02B 6/0068
See application file for complete search history.

(56) References Cited

U.S. PATENT DOCUMENTS

| 11,828,975 B2* | 11/2023 | Yun ..................... G02B 6/0068 |
| 2019/0342477 A1* | 11/2019 | Hatabe ................... H04N 23/56 |
| 2022/0221644 A1* | 7/2022 | Gou .................. G02F 1/133616 |

FOREIGN PATENT DOCUMENTS

| JP | 2010-112735 | 5/2010 |
| JP | 2016-136124 | 7/2016 |
| JP | 2017-166865 | 9/2017 |
| WO | WO 2018/079742 A1 | 5/2018 |

* cited by examiner

*Primary Examiner* — Abdulmajeed Aziz
*Assistant Examiner* — Jessica M Apenteng
(74) *Attorney, Agent, or Firm* — Thorpe North & Western

(57) ABSTRACT

A lighting device includes a plurality of light sources or a light emitting surface, and a light guide plate which light from the light sources or the light emitting surface enters from an end surface thereof. One surface of the light guide plate in its thickness direction is provided with reflection portions, which reflect the light entering from the end surface, and an observation window. A first ratio of a provided area of the reflection portions in the observation window to an entire area of the observation window is more than 2%, and a second ratio of a provided area of the reflection portions in an other part of the light guide plate to an entire area of an other area is more than 1.2 times larger than the first ratio, the other part being a part other than the observation window in the one surface.

7 Claims, 8 Drawing Sheets

LIGHTING DEVICE

TECHNICAL FIELD

This disclosure relates to a lighting device.

BACKGROUND ART

There is a known technology which illuminates an image capturing line (an observation position) of a line sensor by means of a dome-shaped lighting device (See PTL 1, for example).

CITATION LIST

Patent Literature

Patent Literature 1: Japanese Unexamined Patent Application, Publication No. 2017-166865

SUMMARY

An aspect of this disclosure is a lighting device including: a plurality of light sources arranged in an X direction or a light emitting surface which is long in the X direction; and a light guide plate which is long in the X direction and which light from the plurality of light sources or the light emitting surface enters from an end surface thereof in a Y direction which is orthogonal to the X direction, wherein one surface of the light guide plate in its thickness direction is provided with a plurality of reflection portions which reflect the light from the end surface toward an irradiation position to which the light guide plate faces, the light guide plate is provided with an observation window which allows a line sensor to observe the irradiation position through the light guide plate and which is long in the X direction, a first ratio is more than 2%, the first ratio being a ratio of a provided area of the plurality of reflection portions in the observation window to an entire area of the observation window, and a second ratio is more than 1.2 times larger than the first ratio, the second ration being a ratio of a provided area of the reflection portions in an other part of the light guide plate and the other part being part other than the observation window in the one surface.

DETAILED DESCRIPTION

A lighting device according to an embodiment of the present invention will be described below with reference to FIGS. 1 to 7.

Figure 1:
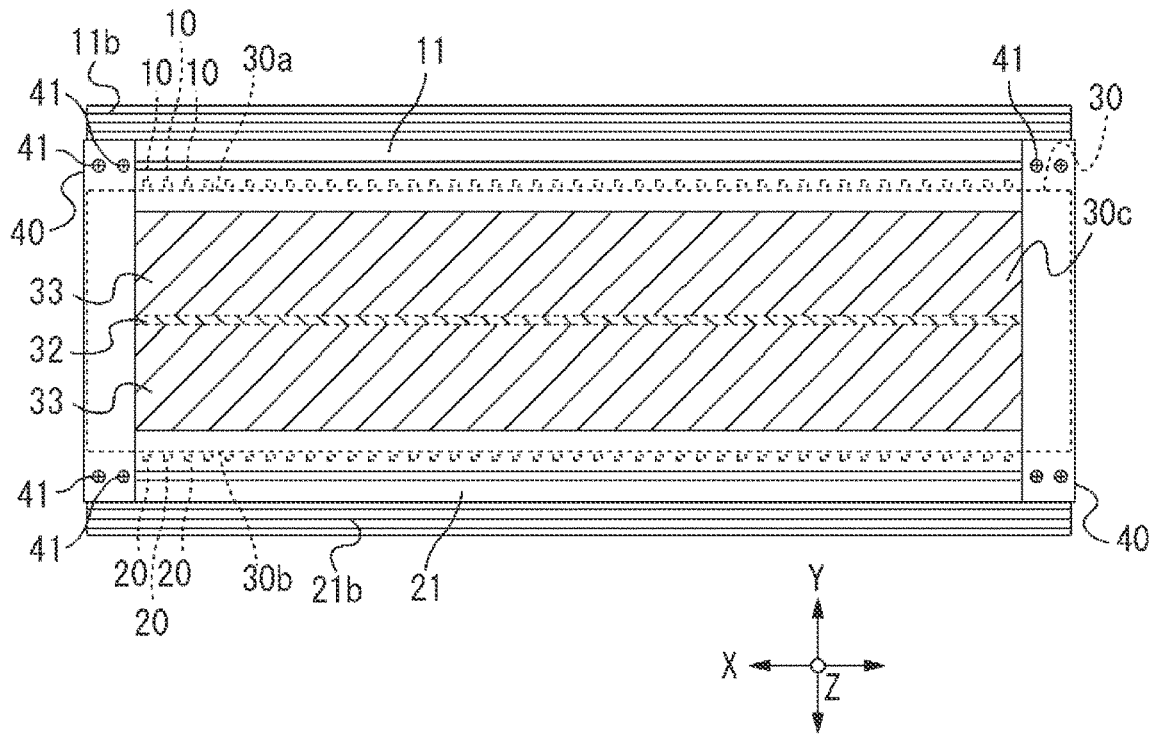
FIG. 1 is a plan view of a lighting device according to an embodiment of the present invention.
Figure 2:
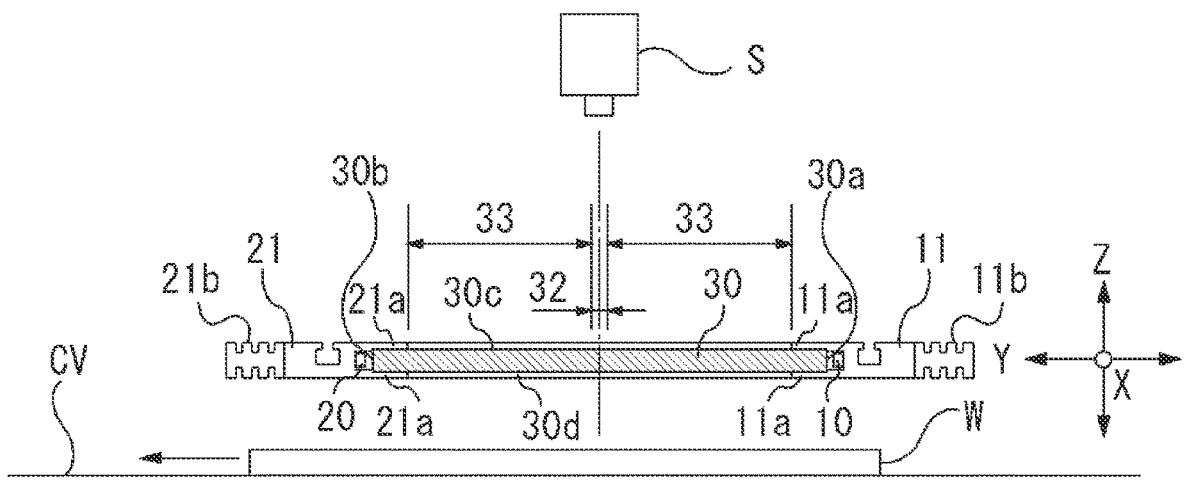
FIG. 2 is a side view showing a using state of the lighting device of this embodiment in a state where fixing members are removed.

As shown in FIG. 2, this lighting device illuminates an object W which is to be observed (inspected) or the like by a line sensor S. As shown in FIG. 1, this lighting device has a plurality of first light sources 10 arranged in a predetermined direction (an X direction in FIG. 1), and a plurality of second light sources 20 arranged in the predetermined direction, and the light sources 10, 20 are a LED (light emitting diode) element such as a chip LED, a bullet Shaped LED, and the like. The plurality of light sources 10 are arranged with a space therebetween in the X direction, and the space is a several millimeters, ten and several millimeters, or the like. The plurality of light sources 20 are also arranged with a space therebetween in the X direction in the same or similar manner. In one example, as shown in FIG. 2, the object W is moved by a conveyer CV in a Y direction which is a direction orthogonal to the X direction.

This lighting device includes a light guide plate 30 which light from the first light sources 10 and light from the second light sources 20 enter. In this embodiment, the light guide plate 30 is a transparent plastic flat plate. The light guide plate 30 may be made from a known material such as a glass and the like.

As shown in FIG. 1, in this embodiment, the predetermined direction is referred to as the X direction, and a direction which is orthogonal to the X direction, and in which the light guide plate 30 extends is referred to as the Y direction. Also, as shown in FIGS. 1 and 2, a direction which is orthogonal to the X direction and the Y direction is referred to as a Z direction.

The light from the first light sources 10 enters the light guide plate 30 from one of end surfaces 30a of the light guide plate 30 in the Y direction, and the light from the second light sources 20 enters the light guide plate 30 from the other one of the end surfaces 30b of the light guide plate in the Y direction.

Figure 5:
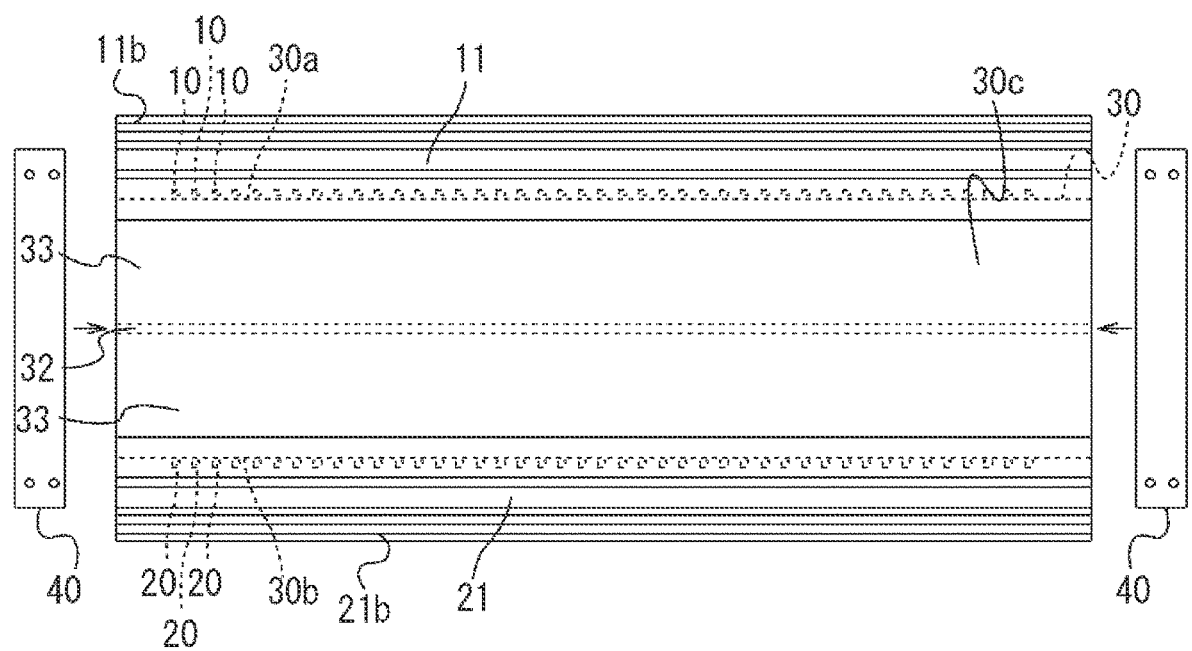
FIG. 5 is a plan view of the lighting device of this embodiment in a state where the fixing members are removed.

As shown in the FIGS. 2 and 5, the first light sources 10 are attached to a first body 11 and the second light sources are attached to a second body 21.

In one example, the first light sources 10 are attached to one of the end surfaces at the light guide plate 30 side of the first body 11 in the Y direction. Also, a pair of protruding portions 11a which protrude in the Y direction is provided on a side of the one of the end surfaces of the first body 11. The pair of protruding portions 11a are arranged with a space therebetween in the Z direction, and one of the end portions of the light guide plate 30 in the Y direction is located between the protruding portions 11a. In this embodiment, the protruding portions 11a are provided over substantially the entire length of the first body 11 in the Y direction. Due to the protruding portions 11a, the light guide plate 30 is positioned with respect to the first body 11 in at least the Z direction.

The second light sources 20 are attached to one of the end surfaces at a side of the light guide plate 30 of the second body 21 in the Y direction, and a pair of protruding portions 21a are provided in the second body 21 in a manner which is the same as or similar to the first body 11.

Figure 4:
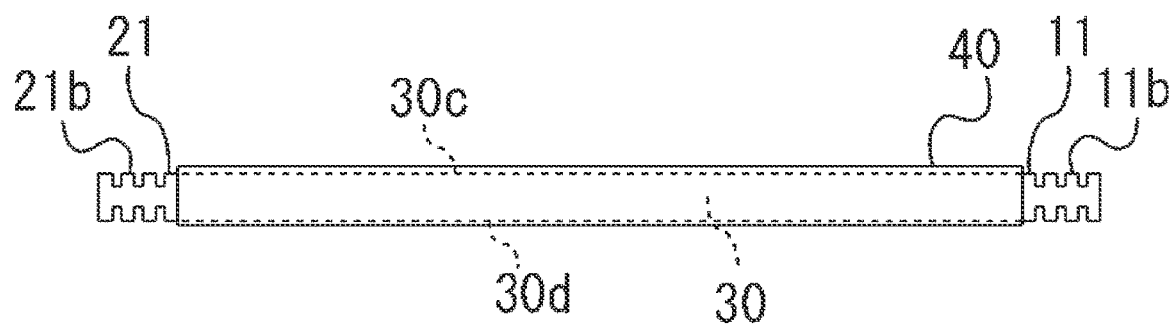
FIG. 4 is a side view of the lighting device of this embodiment.

As shown in FIGS. 2 and 4, heat radiation portions 11b, 21b are formed on end portions of the first body 11 and the second body 21 in the Y direction that are located opposite to the light guide plate 30.

Figure 3:
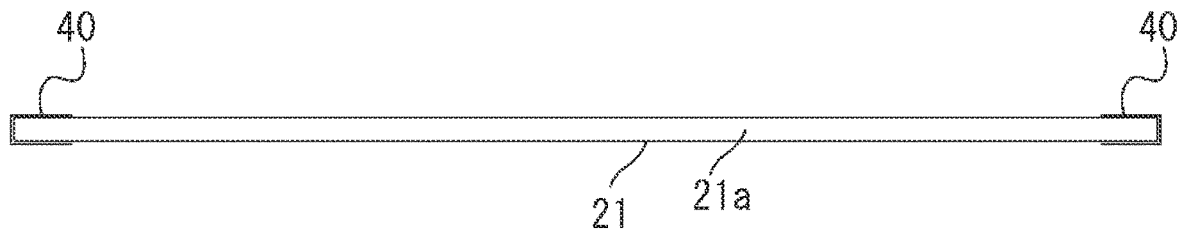
FIG. 3 is a front view of the lighting device of this embodiment.

As shown in FIGS. 1, 3, and 5, fixing members 40 are attached to one end and the other end of the first body 11 and the second body 12 in the X direction. One of the fixing members 40 is fixed to one end of the first body 11 in the X direction by means of a fastening member 41, such as a bolt or the like, and is also fixed to one end of the second body 21 in the X direction by means of a fastening member 41. Also, the other one of the fixing members 40 is fixed to the other end of the first body 11 in the X direction by means of a fastening member 41 and is also fixed to the other end of the second body 21 in the X direction by means of a fastening member 41. Furthermore, the fixing members 40 restrict movement of the light guide plate 30 in the X direction and also connect the first body 11 and the second body 21 with each other. With this configuration, it is possible to attach the light guide plate 30 to the first and the second bodies 11 and 21 easily and in a reliable manner.

With the above configuration, it is possible to manufacture the lighting device with different dimensions in the X direction easily and in reliable manner, which is advantageous for flexibly meeting variety of requirements of customers whose inspection object, inspection condition, and the like are different.

Figure 6:
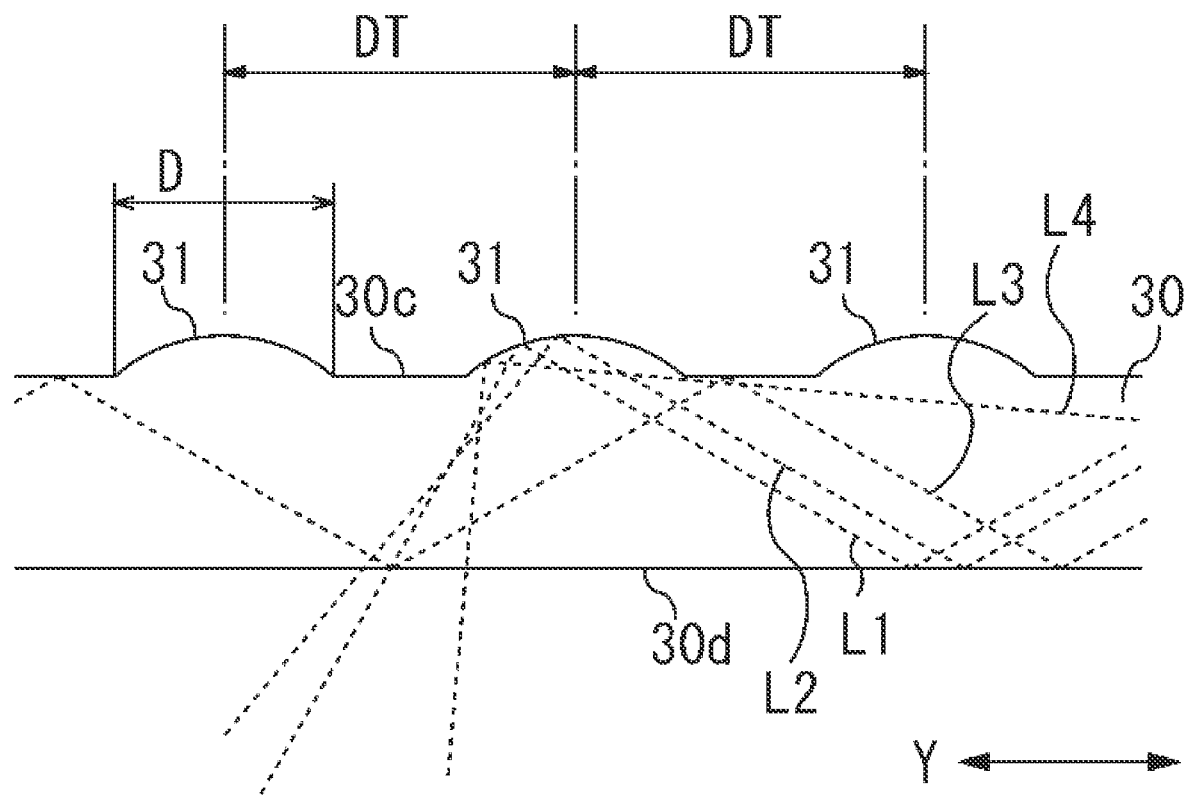
FIG. 6 is a view showing an image of a function of a reflection portion of a light guide plate of the lighting device of this embodiment.

As shown in FIG. 6, a plurality of reflection portions 31 are provided on one surface 30c of the light guide plate 30 in a thickness direction. In this embodiment, the reflection portions 31 are convex lenses each of which protrudes from the one surface 30c in the thickness direction. FIG. 6 shows one of ideal shapes of the reflection portions 31. As shown in FIG. 6, the reflection portions 31 reflect light from the light sources 10, 20 toward an irradiation position to which the light guide plate 30 faces via the other surface 30d of the light guide plate 30 in the thickness direction. Note that FIG. 6 schematically illustrates a function of the reflection portions 31, and FIG. 6 illustrates the thickness dimension of the light guide plate 30 smaller with respect to the size of the reflection portions 31.

Moreover, the reflection portions 31 can be formed by inkjet printing which uses a transparent ultraviolet curing plastic, for example. The reflection portions 31 are arranged with an interval DT therebetween in each of the X direction and the Y direction, and the interval DT is 85 μm, for example.

In this embodiment, as shown in FIGS. 1 and 2, a center side of the light guide plate 30 in the Y direction functions as an observation window 32, and the observation window 32 is long in the X direction. In this embodiment, the observation window 32 is provided over the entire length of the light guide plate 30 in the X direction, but an area of the observation window 32 in the X direction may be any size as long as it corresponds to an observation range of the line sensor. It is preferable that the dimension of the observation window 32 in the Y direction is smaller than 2 cm, and the dimension of the observation window 32 in the Y direction in this embodiment is smaller than 1 cm.

The plurality of reflection portions 31 are provided on the observation window 32 as well. A first diameter in the observation window 32 (a diameter D in FIG. 6) is preferably smaller than 41 μm, more preferably smaller than 36 μm, and the first diameter of the observation window 32 in the present embodiment is 32 μm. That is to say, it is preferable that a first ratio which is a ratio of the provided area where the reflection portions 31 are provided to the entire area of the observation window 32 is smaller than 18 percent. It is more preferable that the first ratio is smaller than 14 percent, and it is about 11 percent in the present embodiment. When the first ratio is higher than the above described rate, obtained images may be indistinct when observing the object W by the line sensor through the observation window 32 as shown in FIG. 2. Also, it is preferable that the first ratio is greater than 2 percent. When the first ratio is below 2 percent, the later described effect cannot be obtained in many cases, but this ratio may be used depending on observation conditions, types of object, and the like. The reflection portions 31 of the observation window 32 are uniformly arranged in this embodiment, however, there may be a case where the reflection portions 31 are unevenly arranged.

Figure 7:
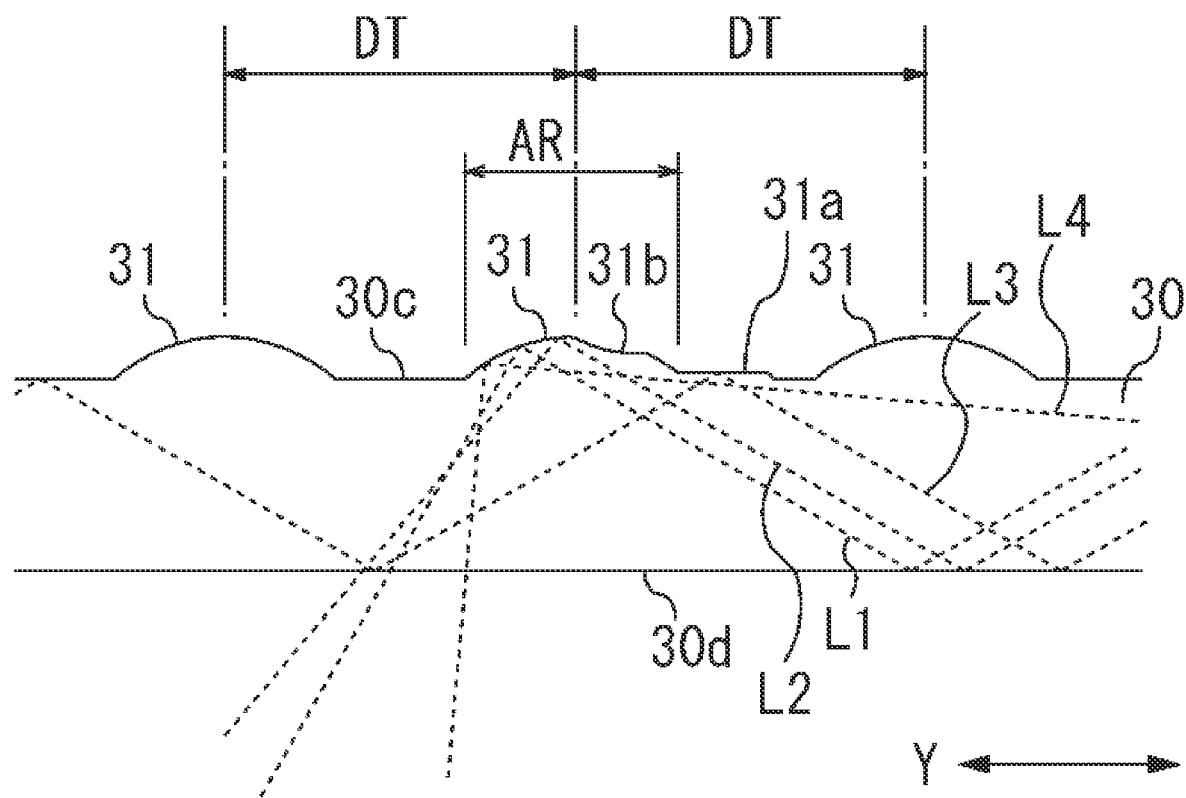
FIG. 7 is a view showing an image of a function of the reflection portion of the light guide plate of the lighting device of this embodiment.

Here, when forming the reflection portions 31, a part which rarely functions as the convex lens for directing light to the irradiation position may be formed. For example, as shown in FIG. 7, in such a case where a part 31a of the reflection portion 31 is thinly formed along the one surface of the light guide surface 30 and the part 31a is substantially a plane surface, the part 31a barely functions as the concave lens. In this case, as shown in FIG. 7, an area of a part of the convex lens AR which directs the light to the irradiation position is used for calculating the first ratio. The same or similar calculation is carried out to obtain a second ratio which will be described below. Also, as shown in FIG. 7, when the reflection portion 31 has a singular portion 31b or a plurality of singular portions 31b whose characteristics is different from the other parts, or when the reflection portion 31 is not a smooth concave portion, it could be said that this kind of reflection portion is also the reflection portion 31 as long as the overall reflection portion has a function that directs light to the irradiation position.

On the other hand, it is preferable that a second ratio which is a ratio of a provided area of the reflection portions 31 in the other part 33 of the light guide plate 30, which is the part other than the observation window 32, to the entire area of the other area 33 is more than 1.5 times larger than the first ratio, and more preferably the second ratio is more than 2 times larger. When the first ratio is greater than 10 percent or the like, the later described effect may be achieved as long as the second ratio is 1.2 times larger than the first ratio. In this embodiment, the diameter of the reflection portions 31 of the observation window 32 is 32 μm, accordingly, it is preferable that a second diameter of each of the reflection portions 31 (the diameter D in FIG. 6) is larger than 45 μm. In this embodiment, the second diameter is 62 μm, and the second ratio is about 42 percent. This lighting device can be put in practice when the second ratio is more than 5 percent. And the preferable second ratio is more than percent, the preferable second ratio for increasing the light intensity is more than 20%, and the preferable second ratio for further increasing the light intensity is more than 25%. Even when the second ratio is below 15%, there may be a case where inspection can be carried out without any problem depending on the observation purposes and the like. In this embodiment, the reflection portions 31 of the other part 33 are uniformly arranged, however, there may be a case where the reflection portions 31 are unevenly distributed. In this embodiment, the dimension of the other part 33 in the Y direction is more than 5 cm, however, when a distance to the irradiation position is short, the same or similar effect may be achieved as long as the dimension of the other part 33 in the Y direction is more than 1 cm.

Also, there may be a case where the reflection portions 30 are not evenly distributed, and it is difficult to confirm the ratio of the entire observation window 23 or the ratio of the entire other part 33. In this case, a ratio of the area of the reflection portions 31 to each of the areas of a plurality of positions on the observation window is obtained at a plurality of positions on the observation window 32, and an average value of the ratios obtained at the plural positions can be set as the first ratio. The second ratio is obtained in the same or the similar manner.

Also, the first and the second ratios are changeable according to the space DT between the reflection portions 31.

As shown in FIG. 2, a known line sensor S is placed at a side of the one surfaces 30c of the light guide plate 30 and obtains images of the object W placed at the irradiation position on the other surface 32d side of the light guide plate 30. Also, unquestionably, the line sensor S is placed along the observation window 32.

With the lighting device having the above described configuration, much amount of light reaches to the line sensor S. Specifically, the light is emitted to the irradiation position from the observation window 32 as well. The light from the light sources 10, 20 moves in the light guide plate 30 as indicated by light beam paths L1, L2, L3, L4 as shown in FIG. 6, and a part of the light beam paths L1, L2, L3, L4 are reflected to the irradiation position by the reflection portions 31. A part of the light beam paths L4 among the others moves substantially vertical with respect to the other surface 30d of the light guide plate 30. Substantially vertical means an angle between the other surface 30d and the light beam path L4 is smaller than 80 degrees, more preferably smaller than 85 degrees, for example. Also, when the light guide plate 30 is made by a plastic material, a critical angle is smaller than 45 degrees and the light enters the reflection portions 31 at an angle greater than the critical angle is reflected.

Accordingly, when the light reflected by the observation window 32 moves substantially vertically with respect to the other surface 30d of the light guide plate 30, and the object W is an object having luster characteristics, there may be a case where observation, inspection, and the like of the object W by using the line sensor S is accurate. Also, when electrical parts or the like protrude from the surface of the object W, a shadow of the electrical parts is hardly formed. Like this, this embodiment is advantageous for reducing change in the brightness of the observation line, which is due to the shape or luster characteristics of the surface of the object W.

Also, by reflecting the light toward the object W at the position of the observation window 32, much amount of light reaches to the line sensor S with respect to various kinds of the object W, which is advantageous for accelerating the inspection speed and improving the inspection. Moreover, unlike the case where the reflection portions 31 are not provided in the observation window 32, the light irradiates the object W from a direction which is along an optical axis of the line sensor S, and therefore, the images obtained by the line sensor S are different from those in a case where the reflection portions 31 are not provided in the observation window 32. This causes a difference in brightness of the object W or how the object W looks in the images, and which results in improving inspection accuracy depending on types of the object W.

Also, the light from the other part 33 irradiates the observation position of the line sensor S. Therefore, the light irradiates the object W at the observation position (irradiation position) from various directions, which achieves the same or the similar effect as the ordinary dome-shaped lighting device. That is to say, it is possible to achieve the same effect as that of the dome-shaped lighting device in a smaller space.

When the second ratio is more than 1.5 times larger than the first ratio, it is possible to observe the object W in a good condition due to a balance between the irradiation amount of the light from the optical axis direction of the line sensor S, the irradiation amount of the light from the other part 33, and sharpness of the images obtained by the line sensor S. Also, like this embodiment, when the second ratio is 2.5 times or 3 times larger than the first ratio, it is more often the case that the object W is observed in a better condition.

Moreover, in such a case where the first ratio is more than 10% or the like, as long as the second ratio is more than 1.2 times larger than the first ratio, an absolute value between the first ratio and the second ratio is more than 2%. In this case also, it is possible to observe the object W in a better condition.

Also, it is possible to set the observation window 32 at any position on the light guide plate 30. For example, it is possible to provide the observation window 32 at one end side of the light guide plate 30 in the Y direction, and the other part 33 at the other end side only with respect to the observation window 32 in the Y direction. Or, it is also possible to provide the observation window 32 at one end side of the light guide plate 30 in the Y direction, and the other part 33 at both end sides with respect to the observation window 32 in the Y direction. These arrangements are advantageous in such a case where the object W can be seen more clearly by irradiating much amount of light from one side.

Moreover, it is also possible to provide a plurality of the observation windows 32 on the light guide plate 30 with a space therebetween in the Y direction.

Also, the second ratio of the other part 33 on one of the sides in the Y direction with respect to the observation window 32 and the second ratio of the other part 33 on the other side in the Y direction can be different. For example, one of the second ratios is more than 1.2 times larger than the other one of the second ratios, more preferably, it could be more than 1.5 times larger than the other ratio. This configuration is advantageous when inspecting the object W which is easier to observe when irradiating strong light from one side in the Y direction.

Further, the configuration in which the lighting device has a plural kinds of light guide plates 30, and the light guide plate 30 is changeable to different types depending on the inspection object is advantageous. In this embodiment, the light guide plate 30 is changeable by attaching and removing the fixing members 40.

Further, such a configuration is also possible that density of the reflection portions 31 of the other part 33 becomes gradually higher toward the observation window 32 side. In this case, much amount of light goes to the radiation position from the vicinity of the observation window 32. In the other part 33, the reflection portions 31 can be distributed in the other manner.

In the other part 33, density of the reflection portions 31 located at the side closer to the observation window 32 can be higher than that of the reflection portions 31 located at the side distant from the observation window 32. In this case, much amount of light from the line sensor S side goes to the irradiation position without providing the reflection portions 31 in the observation window 32. Even when the above configurations are adopted, there is a case where the object W can be observed in a good condition depending on the types of object W, the observation purposes, and the like.

Figure 8:
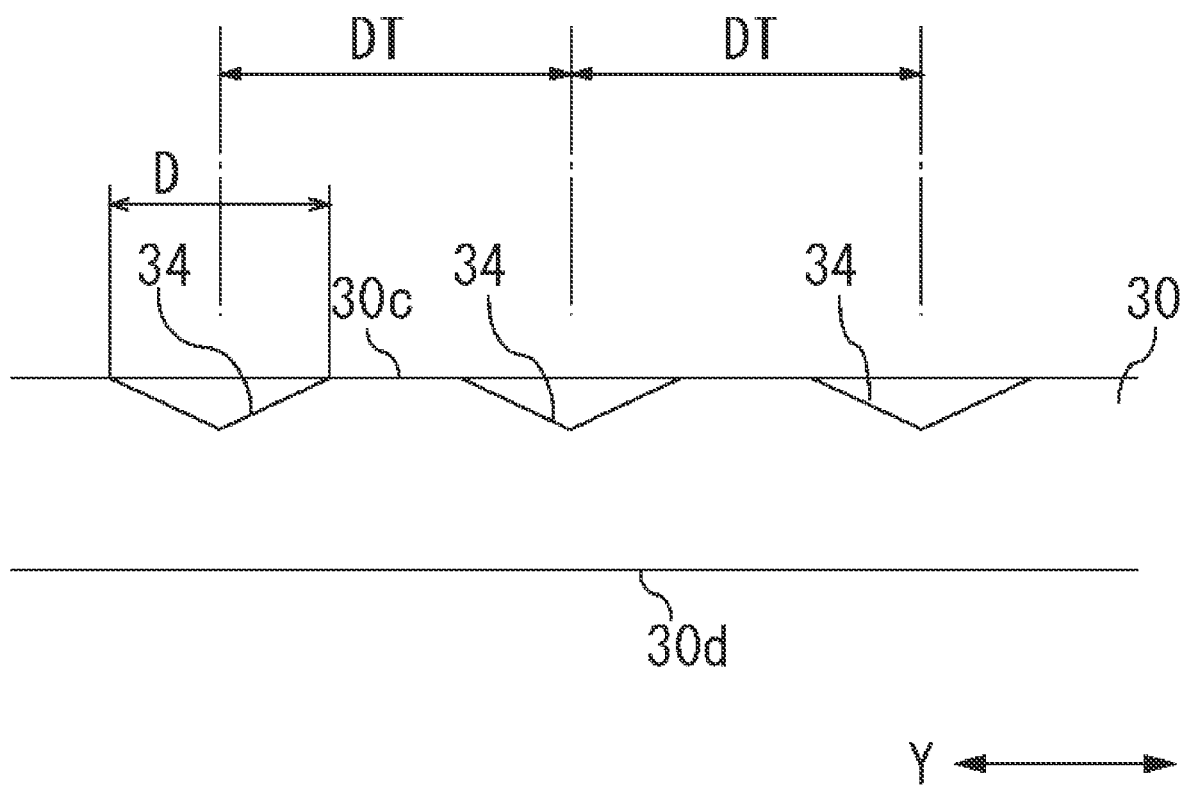
FIG. 8 is a view showing an image of the light guide plate showing a modified example of the lighting device of this embodiment.

Also, as shown in FIG. 8, it is possible to provide a plurality of reflection portions 34 which are recessed portions on the one surface 30c in the thickness direction instead of the reflection portions 31. In this case also, the reflection portions 34 reflect the light from the light sources 10, 20 toward the irradiation position. The reflection portions 34 may be a recessed portion in a conical shape, a recessed portion in a pyramid shape, a recessed portion in a part of a ball shape, or a recessed portion in other shape.

Also, the reflection portions may be formed by attaching reflection members which are small metallic members and the like to the one surface 30c in the thickness direction of the light guide plate 30.

Moreover, it is possible to provide a reflection sheet being in contact with or being close to the one surface 30c in the thickness direction in the other part 33 together with the reflection portions 31, 34 or without providing the reflection portions 31, 34. The reflection sheet may be a known sheet which reflects light. The examples of the reflection sheet are a white sheet such as a paper or the like, a sheet having a metallic luster such as an aluminum foil, and the like. Similar to a case where the one surface 30c in the thickness direction is provided with the reflection portions 31, 42, unevenness due to surface roughing, and the like, when the light that enters from the end surfaces 30a, 30b leaks from the one surface 30c in the thickness direction, an effect which is the same as or similar to the case where the reflection portions 31, 34 are provided in the other part 33 can be achieved. When the reflection sheet is provided together with the reflection portions 31, 34, the amount of light reaches the irradiation position increases.

Further, instead of the plurality of first light sources a light emitting surface which emits the light into the light guide plate 30 from the end surface 30a may be provided. The light emitting surface may be another light guide plate arranged along the end surface 30a. In this case, light enters the said another light guide plate, and the light is emitted from a surface, which is along the end surface 30a, of the said another light guide plate. The same or similar light emitting surface may be provided instead of the plurality of second light sources 20. Further, each of the light sources 10, 20 may be a tip of an optical fiber.

Moreover, it is possible to employ a lighting device including a plurality of light sources 10, 20 arranged side by side in the X direction or a light emitting surface which is long in the X direction, and a light guide plate 30 which is long in the X direction, and into which light from the plurality of light sources 10, 20 or the light emitting surface enters from end surfaces 30a, 30b in the Y direction which is orthogonal to the X direction, a plurality of reflection portions 31, 34 which reflect the light entering from the end surfaces to an irradiation position which faces the light guide plate is provided on one of surfaces of the light guide plate in the thickness direction, and an observation window 32 which allows the line sensor S to observe the irradiation position through the light guide plate 30 and which is long in the X direction, wherein the reflection portions 30a, 30b are not provided on the observation window, and the reflection portions 31, 34 are provided on the other part 33 which is a part other than the observation window 32. An area where the reflection portions 31, 34 are provided in the other part 33 is according to the second ratio. That is to say, the area where the reflection portions 31, 34 are provided on the other part 33 occupies more than 10% with respect to the entire area of the other part 33. Also, it is possible to cut out a part of the light guide plate 30, which is a part corresponding to the observation window 32, so as to form the observation window 32.

In this case, it may be possible to observe the object W in a good condition depending on types of the object W, observation purposes, and the like. Also, in this case, the object W at the observation position (irradiation position) is irradiated from different directions, which achieves the same or the similar effect as the ordinary dome-shaped lighting device. That is to say, it is possible to achieve the same effect as the dome-shaped lighting device in a smaller space.

Figure 9:
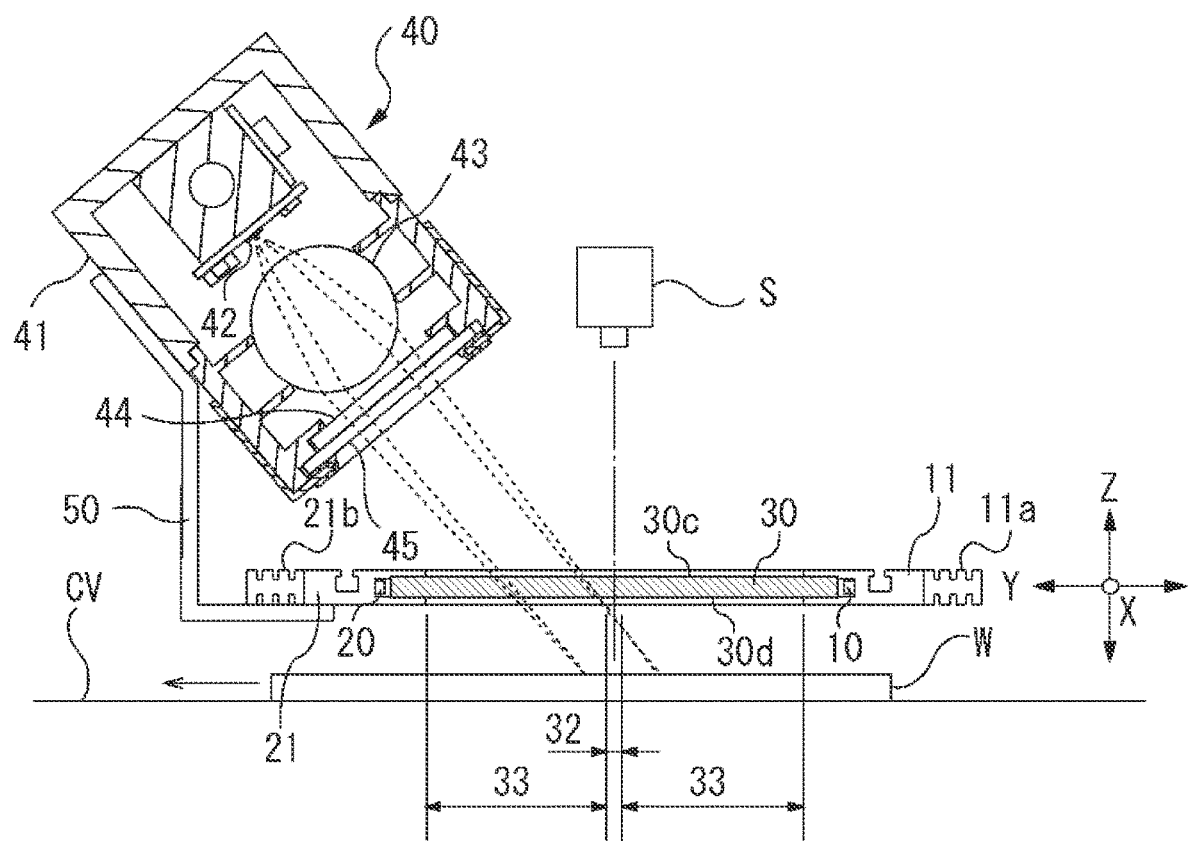
FIG. 9 is a schematic partial sectional view from a side direction of the lighting device of this embodiment.

As shown in FIG. 9, the lighting device may be equipped with lighting equipment 40. The lighting equipment 40 is a lighting device which irradiates the observation position of the line sensor S by a line-shaped light, for example. The lighting equipment 40 in FIG. 9 has a lighting device main body 41 and a plurality of LEDs 42 which are fixed to an inside of the lighting device main body 41 and which are arranged with intervals therebetween in the paper depth direction (X direction) of FIG. 9. Also, this lighting equipment 40 includes a cylindrical lens (a condenser lens) 43 which is fixed to the inside of the lighting device main body 41 and which condenses the light from the plurality of LEDs 42 in a direction orthogonal to the X direction. Also, this lighting equipment 40 has a diffusion lens 44 which diffuses the light from the cylindrical lens mainly in the X direction, and a protective lens 45.

In FIG. 9, one end of the fixing member 50 is fixed to the lighting equipment 40 by a fixing means (not shown) such as a bolt or the like, the other end side of the fixing member 50 is fixed to the second body 21 by a fixing means such as a bolt or the like, and the light guide plate 30 is attached to the second body 21. As described above, the position of the lighting equipment 40 with respect to the light guide plate 30 is fixed by the fixing member 50. Also, the other end side of the fixing member 50 may be fixed to the first body 11 by a fixing means such as a bolt or the like.

With this configuration, the light from the lighting equipment 40 penetrates through other part (a light transmission part) 33 of the light guide plate 30 so as to illuminate the irradiation position of the light guide plate 30. Also, the light from the lighting equipment 40 is in a form of a long line in the X direction. In one example, as shown in FIG. 9, the lighting equipment 40 illuminates the observation position of the line sensor S. Due to the other part 33 having the reflection portions 31, the light from the lighting equipment 40 is diffused, however, much amount of the light from the lighting equipment 40 reaches the observation position. An observation that only uses the light from the light guide plate 30, an observation that only uses the light from the lighting equipment 40, and an observation that uses the light from the light guide plate 30 and the lighting equipment 40 are capable of making different characteristic of various objects W conspicuous. Also, it is possible to manufacture the light guide plate 30 so that, in the other part 33, density of the reflection portions 31 within a part where the light from the lighting equipment 40 penetrates is reduced.

Accordingly, this lighting device can illuminate the observation position of the line sensor S in various states. Furthermore, the light from the lighting equipment 40 penetrates through the other part 33 of the light guide plate 30 so as to illuminate the observation position that is also the irradiation position of the light guide plate 30. Like the dome-shaped lighting device, this embodiment can supply light from various directions to the observation position by means of the light guide plate 30, and change lighting states at the observation position in various ways while reducing its space. Accordingly, it is possible to achieve the various lighting states depending on the types of the object W and inspection requirements in a smaller space.

Here, the lighting equipment 40 in this embodiment concentrates the light from the plurality of LEDs 42 toward the observation position of the line sensor S by means of the cylindrical lens 43. Therefore, the amount of light supplied to the observation position form the lighting equipment 40 becomes two times greater than that provided at the observation position from the light guide plate 30. Accordingly, a wider variety of the lighting states can be provided at the observation position, which achieves providing a various lighting states depending on the types of the object W and the inspection requirements.

Also, this lighting device may further include another lighting device which illuminates the observation position via the other part 33 of the light guide plate 30. Moreover, the lighting equipment 40 may be a known lighting device, and a lighting device which illuminates the observation position from a direction which is coaxial with the line sensor S may be fixed to the light guide plate 30 or the bodies 11, 21.

Further, it is possible to adopt a light guide plate 30 not having the reflection portions 31 in the observation window 32. In this case also, it is possible to supply light from various directions to the observation position by means of the light guide plate 30, and change lighting states at the observation position in various ways while reducing its space, like the dome-shaped lighting device.

Moreover, it is also possible to observe a diagonally downward direction by the line sensor S through the observation window 32 instead of placing the line sensor S to observe the right under direction.

Figure 10:
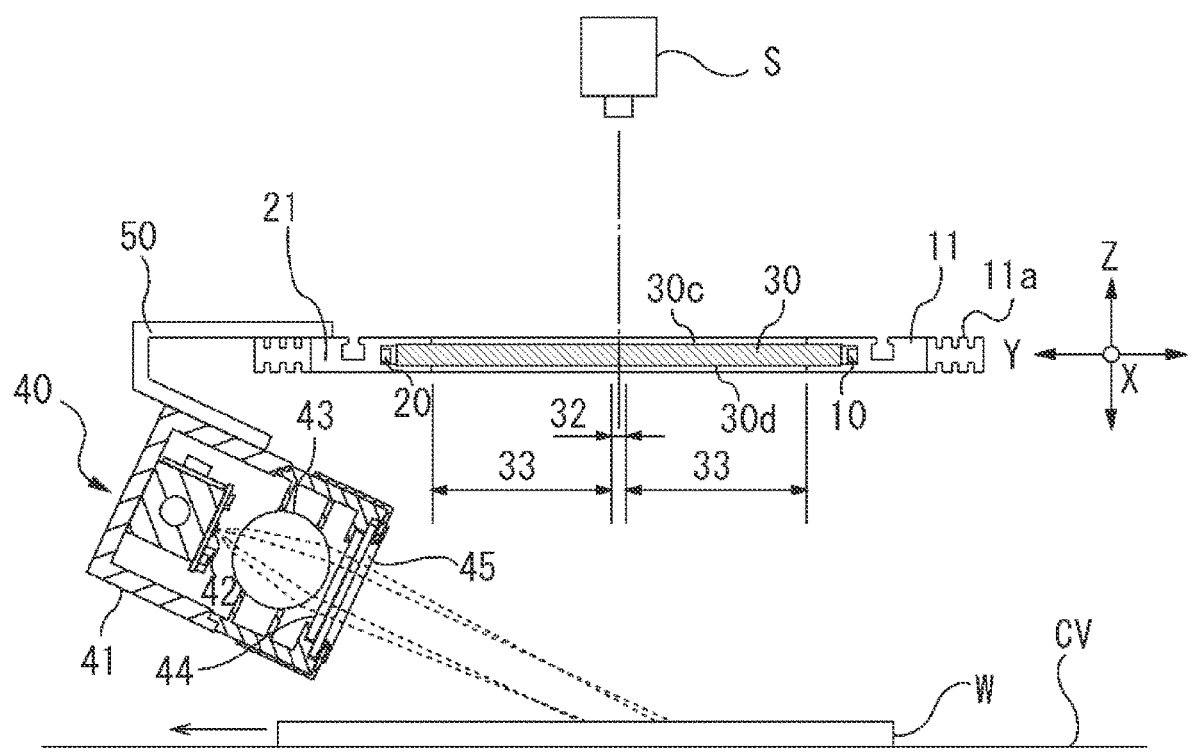
FIG. 10 is a schematic partial sectional view from a side direction showing a modified example of the lighting device of this embodiment.

Also, as shown in FIG. 10, the lighting equipment 40 may be fixed to the second body 21 by the fixing member 50 so that the lighting equipment 40 is placed at a lower side of the light guide plate 30. In this case also, like the dome-shaped lighting device, it is possible to provide the light from various directions to the observation position by means of the light guide plate 30, and change lighting states at the observation position in various ways while reducing its space. In the configuration shown in FIG. 9, the light guide plate 30 can be closer to the object W, which is suitable for such a usage that requires to deliver much more amount of light from the light guide plate 30 to the object W as much as possible. Further, the light from the lighting equipment 40 irradiates the observation position from a shallower angle than that in the case of FIG. 9, which allows unevenness, edge, and the like of products to be more conspicuous in comparison with the case of FIG. 9.

In a conventional dome-shaped lighting device, a slit is provided on an upper end of a reflection dome along a longitudinal direction of a line sensor, and an object which is placed below the reflection dome is observed by the line sensor through the slit. The light from the dome-shaped lighting device irradiates the observation position by the line sensor from various directions. Therefore, it is possible to reduce a shadowed part of the object as much as possible, which is advantageous.

Moreover, the slit is provided on the upper end of the reflection dome, and the line sensor is placed just above the slit. Therefore, in such a case where an object is a flat plate and the like having a mirror surface as an upper surface, an inner surface of the reflection dome, a LED which is a light source, and the like are not reflected by the upper surface of the object which has the mirror surface to be seen from the line sensor, which is advantageous.

However, the state where the inner surface of the reflection dome, the LED which is the light source, and the like are not reflected by the upper surface of the object which has the mirror surface to be seen from the line sensor is a state where the light from the reflection dome insufficiently reaches to the line sensor. That is to say, due to the slit provided at the upper end of the reflection dome, the light irradiates in a diagonal direction from the reflection dome toward the observation position of the line sensor, and the light irradiates in the diagonal direction becomes specular reflection by the upper surface of the object that has the mirror surface. For that reason, there is also a case where the amount of light is not sufficient when observing the object by the line sensor.

Also, there is a case where the reflection dome is increased in size in order to supply sufficient amount of light from various directions to the object.

The following aspect has been made considering the aforementioned circumstances, and a purpose of the following aspect is to provide a lighting device capable of increasing the amount of light which reaches a line sensor without reflecting a light source and the like to be seen from a line sensor when observing an object having a mirror surface as an upper surface, and also capable of saving space, while maintaining the advantages of the dome-shaped lighting device as much as possible.

an aspect of this disclosure is a lighting device including: a plurality of light sources arranged in an X direction or a light emitting surface which is long in the X direction; and a light guide plate which is long in the X direction and which light from the plurality of light sources or the light emitting surface enters from an end surface thereof in a Y direction which is orthogonal to the X direction, wherein one surface of the light guide plate in its thickness direction is provided with a plurality of reflection portions which reflect the light from the end surface toward an irradiation position to which the light guide plate faces, the light guide plate is provided with an observation window which allows a line sensor to observe the irradiation position through the light guide plate and which is long in the X direction, a first ratio is more than 5%, the first ratio being a ratio of a provided area of the plurality of reflection portions in the observation window to an entire area of the observation window, and a second ratio is more than 1.5 times larger than the first ratio, the second ration being a ratio of a provided area of the reflection portions in an other part of the light guide plate and the other part being part other than the observation window in the one surface.

In this aspect, the reflection portions are provided on the observation window, and therefore, when the object is observed by the line sensor through the observation window, the light irradiates the object from the observation window as well. That is to say, the light supplied to the object from the observation window is the light supplied to the object in an observation direction of the line sensor. For that reason, when observing an object having a luster upper surface such as a mirror surface or the like, the amount of light supplied to the line sensor from the object in comparison with a case of the dome-shaped lighting device is increased.

Also, the light is supplied to the object from the reflection portions on the other part which is the part other than the observation window, and the light is supplied to the observation position of the line sensor from various directions.

According to the aforementioned aspect, the lighting device is capable of increasing the amount of light which reaches a line sensor without reflecting a light source or the like to be seen from a line sensor when observing an object having a luster upper surface such as a mirror surface or the like and capable of reducing space, while maintaining advantages of a dome-shaped light device as much as possible.

The invention claimed is:

1. A lighting device, comprising:
   a plurality of light sources arranged in an X direction or a light emitting surface which is long in the X direction; and
   a light guide plate which is long in the X direction and which light from the plurality of light sources or the light emitting surface enters from an end surface thereof in a Y direction which is orthogonal to the X direction, wherein
   one surface of the light guide plate in its thickness direction is provided with a plurality of reflection portions which reflect the light from the end surface toward an irradiation position to which the light guide plate faces,
   the light guide plate is provided with an observation window which allows a line sensor to observe the irradiation position through the light guide plate and the observation window is long in the X direction,
   a first ratio is more than 2%, the first ratio being a ratio of a provided area of the plurality of reflection portions in the observation window to an entire area of the observation window, and
   a second ratio is more than 1.2 times larger than the first ratio, the second ratio being a ratio of a provided area of the reflection portions in an other part of the light guide plate and the other part being part other than the observation window in the one surface.

2. The lighting device according to claim 1, wherein the second ratio is greater than 5%.

3. The lighting device according to claim 1, wherein the reflection portions are lenses which protrude from the light guide plate.

4. The lighting device according to claim 1 further comprising:
   a reflection sheet which is in contact with or close to the other part of the one surface in the thickness direction.

5. The lighting device according to claim 1, further comprising a lighting equipment, wherein the lighting equipment illuminates the irradiation position through a part where the plurality of reflection portions are provided in the light guide plate, or illuminates the irradiation position from a lower side of the light guide plate.

6. A lighting device, comprising:
   a plurality of light sources arranged in an X direction or a light emitting surface which is long in the X direction; and
   a light guide plate which is long in the X direction and which light from the plurality of light sources or the light emitting surface enters from an end surface thereof in a Y direction which is orthogonal to the X direction, wherein
   the light guide plate is provided with an observation window which allows a line sensor to observe an irradiation position through the light guide plate and the observation window is long in the X direction, and
   the lighting device further comprises a reflection sheet which is in contact with or close to a part other than the observation window, the part is on one surface of the light guide plate in its thickness direction.

7. The lighting device according to claim 6, further comprising a lighting equipment, wherein the lighting equipment illuminates the irradiation position through a part where the plurality of reflection portions are provided in the light guide plate, or illuminates the irradiation position from a lower side of the light guide plate.

* * * * *